US011225231B2

(12) United States Patent
Kim et al.

(10) Patent No.: US 11,225,231 B2
(45) Date of Patent: Jan. 18, 2022

(54) BRAKE CONTROL SYSTEM USED IN A VEHICLE AND CONTROL METHOD THEREOF

(71) Applicant: LG ELECTRONICS INC., Seoul (KR)

(72) Inventors: Tae Hyun Kim, Seoul (KR); Beom Oh Kim, Seoul (KR); Ji Chan Maeng, Seoul (KR); Won Ho Shin, Seoul (KR); Jong Hoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 16/559,419

(22) Filed: Sep. 3, 2019

(65) Prior Publication Data
US 2019/0389442 A1    Dec. 26, 2019

(51) Int. Cl.
*B60T 8/174*    (2006.01)
*B60T 7/12*    (2006.01)
(Continued)

(52) U.S. Cl.
CPC ............... *B60T 8/174* (2013.01); *B60T 7/12* (2013.01); *B60T 8/171* (2013.01); *B60T 8/172* (2013.01);
(Continued)

(58) Field of Classification Search
CPC . B60T 8/174; B60T 7/12; B60T 8/171; B60T 17/22; B60T 8/172; B60T 2250/04; B60T 2270/88; F16D 66/02
See application file for complete search history.

(56) References Cited

U.S. PATENT DOCUMENTS

| | | | |
|---|---|---|---|
| 5,948,035 A * | 9/1999 | Tomita | B60T 8/172 701/70 |
| 2011/0264300 A1* | 10/2011 | Tuononen | G01M 17/02 701/1 |

(Continued)

FOREIGN PATENT DOCUMENTS

| | | |
|---|---|---|
| KR | 101338433 | 12/2013 |
| KR | 1020190023381 | 3/2019 |

*Primary Examiner* — Geepy Pe
*Assistant Examiner* — Kyle J Kingsland
(74) *Attorney, Agent, or Firm* — Lee, Hong, Degerman, Kang & Waimey PC (57) ABSTRACT

The present disclosure discloses a brake control system for use in a vehicle and a control method thereof. A brake control system may be configured to include a brake pad for braking the vehicle by pressing a brake disc provided in the vehicle, a measuring apparatus for measuring the vehicle speed, the wear level of the brake pad, the traveling distance of the vehicle, the braking distance of the vehicle, and the braking pressure applied by the brake pad to the brake disc at braking, and a controller connected with the measuring apparatus and for controlling an operation of the brake pad. The controller may compare an initial braking distance, which is a design value of the braking distance before initial traveling of the vehicle, with a current braking distance, which is a braking distance after traveling of the vehicle during a certain duration, and increase the braking pressure of the brake pad in response to the amount of increase in the braking distance, when the amount of increase in the braking distance, which is a difference value between the current braking distance and the initial braking distance, is out of a setting range. The brake control system may transmit and receive a wireless signal in a mobile communication network constructed according to 5G (Generation) communication.

17 Claims, 4 Drawing Sheets

(51) Int. Cl.
*B60T 8/171* (2006.01)
*B60T 17/22* (2006.01)
*B60T 8/172* (2006.01)
*F16D 66/02* (2006.01)

(52) U.S. Cl.
CPC ........... *B60T 17/22* (2013.01); *B60T 2250/04* (2013.01); *B60T 2270/88* (2013.01); *F16D 66/02* (2013.01)

(56) References Cited

U.S. PATENT DOCUMENTS

2013/0184955 A1* 7/2013 Kobayashi ............ B60T 8/1764
701/72
2015/0183410 A1* 7/2015 Ko ...................... B60T 8/17558
701/96

* cited by examiner

BRAKE CONTROL SYSTEM USED IN A VEHICLE AND CONTROL METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2019-0081275, filed on Jul. 5, 2019, the contents of which are incorporated by reference herein in its entirety.

BACKGROUND

1. Technical Field

An embodiment relates to a brake control system for use in a vehicle and a control method thereof, and more particularly, to a brake control system and a control method thereof, which may learn an artificial intelligence model to select a braking pressure suitable for a traveling condition, and to control to brake a vehicle by the selected braking pressure.

2. Description of Related Art

The contents described in this section merely provide background information about an embodiment and do not constitute the related art.

A brake control system used in a vehicle play a very important role in the safety of vehicle traveling. When braking the vehicle, it is possible to prevent occurrence of an accident, and human and physical damages only when the brake should be normally operated at all times. Accordingly, the brake control system has a design braking distance considering safety, and needs to be managed so that the safety braking distance is maintained.

However, as the operating duration of the vehicle increases and the vehicle ages, the braking distance may gradually increase due to the wear of a brake pad, the wear of a brake disc, etc., thereby occurring a situation that exceeds the allowable range in the design, thereby causing a dangerous situation during traveling of the vehicle. Accordingly, even when the braking distance of the vehicle increases, development of a brake control system for controlling the braking distance is required so that the braking distance falls within at least a design safety range.

Meanwhile, research and development of the technology about Artificial Intelligence (AI) has recently been spreading. The artificial intelligence is an area of computer engineering and information technology that studies methods to make computers mimic intelligent human behaviors such as reasoning, learning, self-improving, and the like, and means enabling the computer to imitate an intelligent behavior of human.

In the brake control system for controlling the braking distance, a technology using an artificial intelligence model learning may be used.

Korean Patent Laid-Open Publication No. 10-2019-0023381 discloses a content relating to a wear amount measuring apparatus and a wear amount measuring method of a brake pad.

Korean Patent No. 10-1338433 discloses a control method of an electric brake apparatus, which estimates a change in the clamping force of the electric brake apparatus such as the wear of the pad from the amount of current supplied for driving a motor and the rotary angle of a motor shaft, and adjusts the amount of current according to a change in the clamping force of the electric brake to provide a stable clamping force.

However, the above-mentioned documents do not disclose a configuration of a brake control system that may reduce a braking distance when the braking distance increases, and a configuration for deriving the braking distance required for each traveling condition of the vehicle by using an artificial intelligence learning model.

SUMMARY OF THE DISCLOSURE

An embodiment proposes a method for controlling so that a braking distance falls within a safe range, when the braking distance of a vehicle increases due to the traveling of the vehicle.

An embodiment proposes a method for deriving the braking distance required for each traveling condition of the vehicle by using an artificial intelligence model learning.

An embodiment proposes a method for controlling the braking distance of the vehicle by using a value about the braking distance derived by using the artificial intelligence model learning.

The problem to be solved by an embodiment is not limited to the above-mentioned technical problems and other technical problems not described above may be clearly understood by those skilled in the art to which an embodiment pertains from the following description.

For achieving the objects, a brake control system may be configured to include a brake pad for braking the vehicle by pressing a brake disc provided in the vehicle, a measuring apparatus for measuring the vehicle speed, the wear level of the brake pad, the traveling distance of the vehicle, the braking distance of the vehicle, and the braking pressure applied by the brake pad to the brake disc at braking, and a controller connected with the measuring apparatus and for controlling an operation of the brake pad.

The controller may compare an initial braking distance, which is a design value of the braking distance before initial traveling of the vehicle, with a current braking distance, which is a braking distance after traveling of the vehicle during a certain duration, and increase the braking pressure of the brake pad in response to the amount of increase in the braking distance, when the amount of increase in the braking distance, which is a difference value between the current braking distance and the initial braking distance, is out of a setting range.

The amount of increase in the braking pressure may be a value in each vehicle speed condition, which has been learned according to an Artificial Intelligence model so that the amount of increase in the braking distance satisfies the setting range in the condition where the vehicle speeds are different from each other.

The controller may be connected with a processor for deriving the amount of increase in the braking pressure of the brake pad.

The processor may perform learning according to the Artificial Intelligence model, and receive at least one input factor to derive the amount of increase in the braking pressure.

The input factor may be at least one of the vehicle speed, the wear level of the brake pad, the traveling distance of the vehicle, the braking distance of the vehicle, and the braking pressure of the brake pad.

The amount of increase in the braking pressure may be a value at which the amount of increase in the braking distance is set to zero or a positive setting value in the condition where at least one of the vehicle speed, the wear level of the brake pad, the traveling distance of the vehicle, the braking distance of the vehicle, and the braking pressure of the brake pad is different, in the learning mode according to the Artificial Intelligence model.

The brake control system may further include a communication unit for communicating with a server, and the processor may be provided in the server.

The controller may receive information about the amount of increase in the braking pressure from the server.

The brake control system may further include a memory unit for storing information about the amount of increase in the braking pressure.

The controller may select the amount of increase in the braking pressure based on the information about the amount of increase in the braking pressure stored in the memory unit.

The setting value of the amount of increase in the braking distance may be set differently, respectively, in the condition where the vehicle speeds are different from each other.

For achieving the objects, a method for operating a brake control system may include determining whether the braking distance of the vehicle falls within a setting range, storing information about the braking distance, when the braking distance of the vehicle is out of the setting range, calculating the amount of increase in the braking distance from the stored information about the braking distance, and braking the vehicle by adding the amount of increase in the braking pressure corresponding to the amount of increase in the braking distance to the braking pressure.

The amount of increase in the braking pressure may be a value in each vehicle speed condition, which has been learned according to an Artificial Intelligence model so that the amount of increase in the braking distance satisfies the setting range in the condition where the vehicle speeds are different from each other.

The brake control system may include a controller for controlling an operation of the brake pad, and the controller may be connected with a processor for deriving the amount of increase in the braking pressure of the brake pad.

The processor may perform learning according to the Artificial Intelligence model, and receive at least one input factor to derive the amount of increase in the braking pressure.

The method for operating a brake control system may further include storing information about the braking distance, when the braking distance of the vehicle falls within the setting range.

The controller may determine the time point when the braking distance of the vehicle reaches the setting range from the stored information about the braking distance.

In an embodiment, it is possible to increase the braking pressure of the brake pad to reduce the braking distance when the braking distance increases due to the increase in the traveling duration of the vehicle, thereby suppressing occurrence of an accident due to the increase in the braking distance.

In an embodiment, it is possible to select the appropriate braking pressure even when the traveling condition of the vehicle is different from each other through the artificial intelligence model learning, thereby achieving the safety of the vehicle traveling.

In an embodiment, it is possible to continuously perform the artificial intelligence model learning, thereby quickly deriving the braking pressure suitable for the changed traveling condition even when the traveling condition of the vehicle is continuously changed.

DETAILED DESCRIPTION

Hereinafter, exemplary embodiments will be described in detail with reference to the accompanying drawings. Since the embodiments may be modified variously and may have various forms, specific embodiments are illustrated in the drawings and described in detail in the following description. However, it should be understood that this is not intended to limit the embodiments to specific forms disclosed, and includes all modifications, equivalents, and substitutes included in the spirit and scope of the embodiments.

Furthermore, these terms such as "first," "second," and other numerical terms may be used herein only to describe various elements, but these elements should not be limited by these terms. Furthermore, these terms such as "first," "second," and other numerical terms, are used only to distinguish one element from another element. Further, terms that are specifically defined considering the configuration and operation of an embodiment are only intended to explain an embodiment, and do not limit the scope of an embodiment.

In the description of an embodiment, when described as being formed at "on (above)" or "under (below)" of each element, on (above) or under (below) includes both the case where two elements directly contacts and the case where one or more other elements are formed to be disposed between the two elements (indirectly). Further, when expressed as "on (above)" or "under (below)," it may include the meaning of not only upwards but also downwards with respect to one element.

Further, the relational terms such as "top/upper/above" and "bottom/lower/below", etc. used below do not necessarily require or imply any physical or logical relationship or order between such entities or elements, and may also be used to distinguish any one entity or element from another entity or element.

Figure 1:
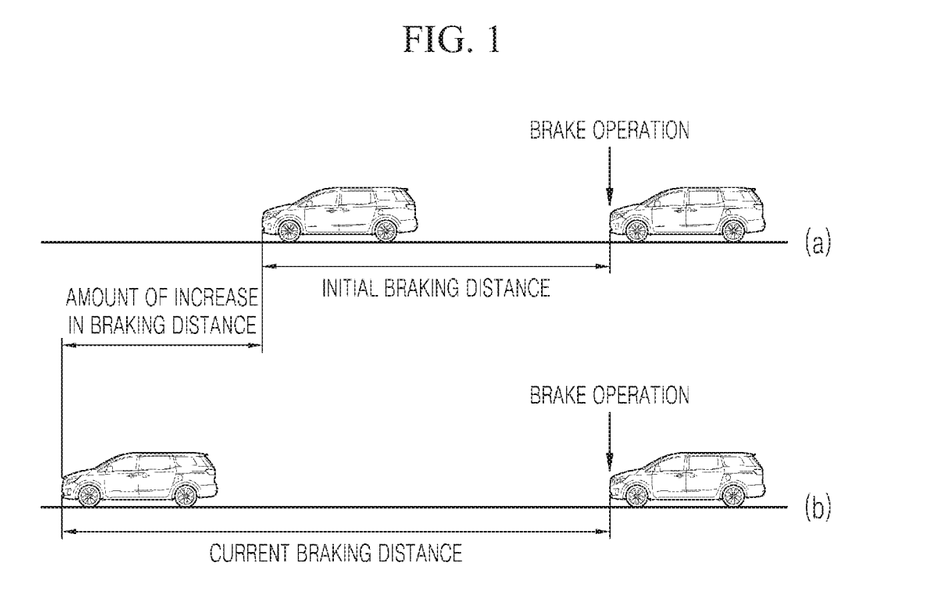
FIG. 1 is a diagram for explaining that a braking distance of a vehicle brake increases by using a vehicle.

FIG. 1 is a diagram for explaining that the braking distance of a vehicle brake increases by using a vehicle. FIG. 1A shows a braking distance when braking at the initial traveling of the vehicle, and FIG. 1B shows the braking distance when braking after the vehicle travels for a certain duration.

Referring to FIG. 1A, when braked at the initial traveling, the vehicle may have a braking distance that is the same as or extremely similar to the initial braking distance, which is a design value of the braking distance before the initial traveling of the vehicle.

Referring to FIG. 1B, when the vehicle is braked after traveling for a certain duration, the current braking distance of the vehicle may further increase than the initial braking distance. This is one feature of the aging phenomenon caused by the traveling of the vehicle.

The reason that the braking distance of the vehicle also increases according to continuous traveling of the vehicle is because there may be various ones such as, for example, the wear of a brake pad 100 of the vehicle, performance deterioration of brake oil, the wear of the brake disc braking the vehicle by contacting the brake pad 100, performance deterioration due to the aging of a brake apparatus including the brake pad 100 and the brake disc, etc.

If the braking distance of the vehicle increases, the risk of an accident may also increase. Accordingly, it is necessary to reduce the current braking distance after traveling the vehicle for a certain duration. That is, it is necessary to control so that the amount of increase in the braking distance, which is a difference value between the current braking distance and the initial braking distance, is zero, or the amount of increase in the braking distance becomes a range, which may reduce the risk of an accident, or less.

Figure 2:
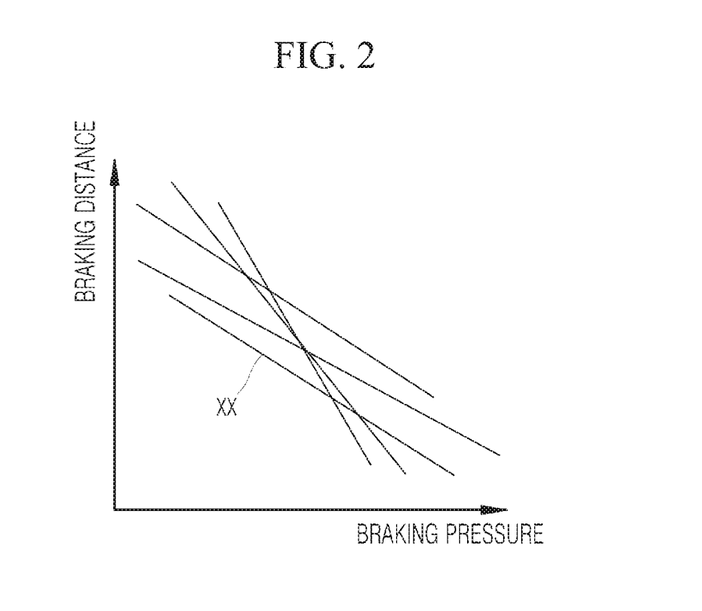
FIG. 2 is a graph showing the relationship between the braking pressure of the vehicle and the braking distance of the vehicle brake.

FIG. 2 is a graph showing the relationship between the braking pressure of a vehicle and the braking distance of a vehicle brake. The braking pressure of the vehicle may mean a force that the brake pad 100 presses the brake disc contacting therewith.

As shown in FIG. 2, the relationship between the braking pressure and the braking distance is such that the braking distance may decrease as the braking pressure increases, and may be represented by a straight line where the ratio of the braking pressure to the braking distance, that is, the slope is generally constant.

In FIG. 2, a plurality of lines indicating the relationship between the braking pressure and the braking distance have been shown, and this is because the value of the slope is different from each other according to a difference in the vehicle speed at braking.

When braking in a state where the vehicle speed is low, the braking distance may decrease relatively rapidly as the braking pressure increases, and when braking in a state where the vehicle speed is high, the braking distance may decrease relatively smoothly as the braking pressure increases.

At this time, the same line in FIG. 2 shows the relationship between the braking pressure and the braking distance when the vehicle speed is the same at braking of the vehicle. Hereinafter, a phenomenon in which a line indicating the relationship between the braking pressure and the braking distance of the vehicle is shifted by using the vehicle will be described.

Figure 3:
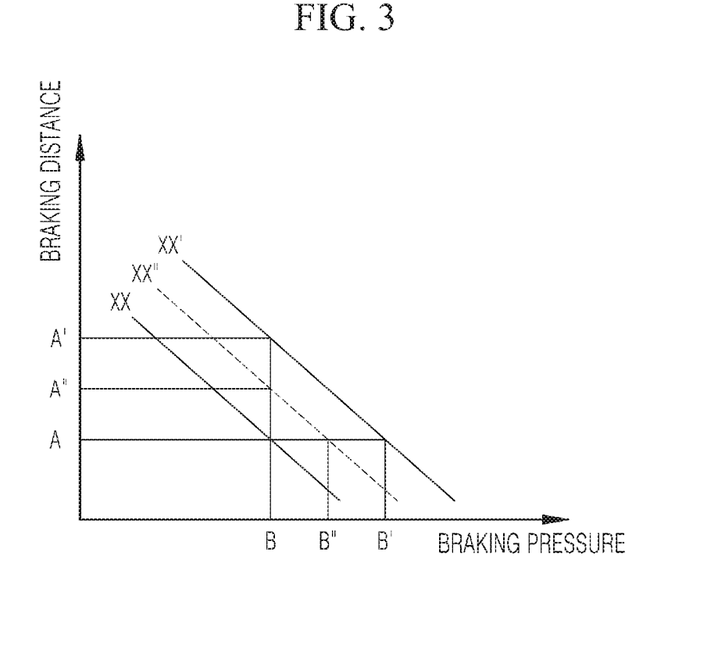
FIG. 3 is a graph for explaining a phenomenon in which a line XX is shifted in FIG. 2 by using the vehicle.

FIG. 3 is a graph for explaining a phenomenon in which the line XX in FIG. 2 is shifted by using a vehicle. For clarity, a case where the vehicle speed is always the same at braking of the vehicle will be described. That is, in FIG. 3, the line XX, the line XX', and the line XX" all have the same vehicle speed at braking of the vehicle.

The line XX indicates the relationship between the braking pressure and the braking distance according to the design value of the braking distance before the initial traveling of the vehicle. When the vehicle is continuously travelled, the braking distance may be lengthened due to the aging of the vehicle.

As the vehicle is travelled, the relationship between the braking pressure and the braking distance of the vehicle may be shifted from the line XX to the line XX'. At this time, the relationship between the braking pressure and the braking distance of the vehicle may be moved in parallel from the line XX to the line XX'. That is, when the vehicle is continuously travelled, the braking distance may increase at the same braking pressure, and the braking pressure may increase in order to have the same braking distance.

For example, when the braking pressure is B, the initial braking distance is A, but the current braking distance after traveling of the vehicle during a certain duration may increase to A'. On the other hand, when the braking distance is A, the initial braking pressure required is B, but the current braking pressure required to have the braking distance A after traveling of the vehicle during a certain duration may increase to B'.

On the other hand, in FIG. 3, the line XX" indicates the relationship between the braking pressure and the braking distance that may reduce the risk of an accident. For example, when the braking pressure is B, the braking distance should be at least A" or less for the safety of the traveling of the vehicle. The numerical value corresponding to the line XX" may be a setting value.

Figure 4:
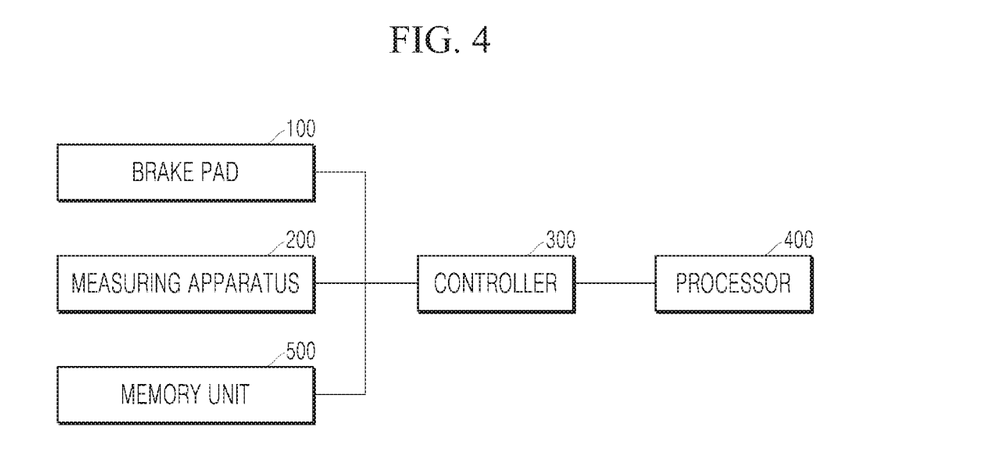
FIG. 4 is a diagram showing a brake control system used in the vehicle according to an embodiment.

FIG. 4 is a diagram showing a brake control system used in a vehicle according to an embodiment. The brake control system may include the brake pad 100, a measuring apparatus 200, and a controller 300.

The brake pad 100 may press the brake disc provided in the vehicle to brake the vehicle. An operation of the brake pad 100 may be controlled by the controller 300.

The measuring apparatus 200 may measure the vehicle speed, the wear level of the brake pad 100, the traveling distance of the vehicle, the braking distance of the vehicle, and the braking pressure applied by the brake pad 100 to the brake disc at braking. For this purpose, the measuring apparatus 200 may be provided with various sensors and a lower measuring means.

For example, a speedometer for measuring the vehicle speed, a brake pad 100 sensor for measuring the wear level of the brake pad 100, a distance totalizer for the vehicle for measuring the traveling distance of the vehicle, a braking distance measuring means of the vehicle, a braking pressure measuring means of the vehicle, etc. may be provided in the measuring apparatus 200.

The controller 300 may be connected with the measuring apparatus 200, and may control an operation of the brake pad 100. The controller 300 may receive various measurement data from the measuring apparatus 200.

The controller 300 may control the braking pressure applied by the brake pad 100 to the brake disc. That is, since the braking distance increases after traveling of the vehicle during a certain duration, the controller 300 may control an operation of the brake pad 100 so as to increase the braking pressure considering the above.

The controller 300 may compare the initial braking distance, which is a design value of the braking distance before the initial traveling of the vehicle, with the current braking distance, which is a braking distance after the traveling of the vehicle during a certain duration.

The controller 300 may increase the braking pressure of the brake pad 100 in response to the amount of increase in the braking distance, when the amount of increase in the braking distance, which is a difference value between the current braking distance and the initial braking distance, is out of a setting range.

Referring to FIG. 3, when the braking pressure is B, the initial braking distance is A. The braking distance after traveling of the vehicle during a certain duration, that is, the current braking distance has been increased to A' from the initial braking distance. At this time, the amount of increase in the braking distance is A'-A.

When the braking pressure is B, the setting range of the amount of increase in the braking distance is A"-A. Accordingly, the amount of increase in the braking distance of the vehicle has increased further by A'-A" than the setting range. In this case, the controller 300 may control the brake pad 100 so as to increase the braking pressure of the brake pad 100 for reducing the braking distance.

The amount of increase in the braking pressure may be learned according to an Artificial Intelligence (AI) model so that the amount of increase in the braking distance satisfies the setting range in the condition where the vehicle speeds are different from each other.

At this time, the amount of increase in the braking pressure may be a value at each vehicle speed condition. That is, the amount of increase in the braking pressure may vary according to the vehicle speed at braking of the vehicle. The foregoing description with reference to FIG. 3 has explained, as an example, a case where the vehicle speed is the same at braking of the vehicle.

Since the ratio of the braking distance to the braking pressure, that is, the slope of the straight line of FIG. 3 varies according to the vehicle speed at braking of the vehicle, the amount of increase in the braking distance and the amount of increase in the braking pressure required may also vary according to the vehicle speed at braking of the vehicle.

As described above, since an embodiment derives the amount of increase in the braking pressure of the brake pad 100 through the artificial intelligence model learning, the artificial intelligence model will be described below.

Artificial intelligence (AI) is an area of computer engineering science and information technology that studies methods to make computers mimic intelligent human behaviors such as reasoning, learning, self-improving, and the like.

Also, artificial intelligence does not exist on its own, but is rather directly or indirectly related to a number of other fields in computer science. In recent years, there have been numerous attempts to introduce an element of artificial intelligence into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, that are capable of learning, making predictions, and enhancing its own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout learning. The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein. An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron may be activated and output an output value obtained through an activation function.

A deep neural network with a plurality of hidden layers between the input layer and the output layer may be the most representative type of artificial neural network which enables deep learning, which is one machine learning technique.

An ANN may be trained using learning data. Here, the learning may refer to the process of determining parameters of the artificial neural network by using the learning data, to perform tasks such as classification, regression analysis, and clustering of inputted data. Such parameters of the artificial neural network may include synaptic weights and biases applied to neurons.

An artificial neural network trained using learning data may classify or cluster inputted data according to a pattern within the inputted data.

Throughout the present specification, an artificial neural network trained using learning data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the learning data.

Among the functions that may be thus derived, a function that outputs a continuous range of values may be referred to as a regressor, and a function that predicts and outputs the class of an input vector may be referred to as a classifier.

In supervised learning, an artificial neural network may be trained with learning data that has been given a label.

Here, the label may refer to a target answer (or a result value) to be guessed by the artificial neural network when the learning data is inputted to the artificial neural network.

Throughout the present specification, the target answer (or a result value) to be guessed by the artificial neural network when the learning data is inputted may be referred to as a label or labeling data.

Throughout the present specification, assigning one or more labels to learning data in order to train an artificial neural network may be referred to as labeling the learning data with labeling data.

Training data and labels corresponding to the learning data together may form a single learning set, and as such, they may be inputted to an artificial neural network as a learning set.

The learning data may exhibit a number of features, and the learning data being labeled with the labels may be interpreted as the features exhibited by the learning data being labeled with the labels. In this case, the learning data may represent a feature of an input object as a vector.

Using learning data and labeling data together, the artificial neural network may derive a correlation function between the learning data and the labeling data. Then, through evaluation of the function derived from the artificial neural network, a parameter of the artificial neural network may be determined (optimized).

Unsupervised learning is a machine learning method that learns from learning data that has not been given a label.

More specifically, unsupervised learning may be a learning scheme that trains an artificial neural network to discover a pattern within given learning data and perform classification by using the discovered pattern, rather than by using a correlation between given learning data and labels corresponding to the given learning data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through learning. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled learning data and unlabeled learning data.

One semi-supervised learning technique involves reasoning the label of unlabeled learning data, and then using this reasoned label for learning. This technique may be used advantageously when the cost associated with the labeling process is high. Reinforcement learning may be based on a theory that given the condition under which a reinforcement learning agent may determine what action to choose at each time instance, the agent may find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters may be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate. GD obtains a slope of the cost function through use of partial differential equations, using each of model parameters, and updates the model parameters by adjusting the model parameters by a learning rate in the direction of the slope.

SGD may include a method that separates the learning dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Accordingly, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of learning, the hyperparameters may be set to optimal values that provide a stable learning rate and accuracy.

The controller 300 may be connected to a processor 400 for deriving the amount of increase in the braking pressure of the brake pad 100. The processor 400 may perform learning according to an artificial intelligence model, and receive at least one input factor to derive the amount of increase in the braking pressure.

The processor 400 may include an artificial intelligence neural network, and receive an input factor to learn an artificial intelligence model based on it to derive the amount of increase in the braking pressure of the brake pad 100.

At this time, the input factor may be at least one of the vehicle speed, the wear level of the brake pad 100, the traveling distance of the vehicle, the braking distance of the vehicle, and the braking pressure of the brake pad 100. Further, the factors affecting the derivation of the amount of increase in the braking pressure of the brake pad 100 may additionally be the input factor. Specifically, the vehicle speed may be a vehicle speed at braking of the vehicle.

At this time, since the value of the input factors may change minutely with time, it may be appropriate to set the average value for the unit time as the value of the input factors. Accordingly, in the present specification, the input factors may mean an average value for the unit time.

On the other hand, the brake control system may further include a communication unit for communicating with a server, and the controller 300 may communicate with the server through the communication unit. The brake control system including the communication unit may be provided in the vehicle.

The server may store the artificial intelligence model, and also store data required for learning the artificial intelligence model. Further, the server may evaluate the artificial intelligence model, and even after the evaluation, update the artificial intelligence model for better performance.

The communication unit may be configured to include at least one of a mobile communication module and a wireless internet module. Further, the communication unit may further include a near-field communication module.

The mobile communication module transmits and receives a wireless signal with at least one of a base station, an external terminal, and a server in a mobile communication network constructed according to technical standards or communication schemes for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G mobile communication, etc.).

The wireless internet module refers to a module for wireless internet access, and may be provided in the vehicle. The wireless internet module is configured to transmit and receive a wireless signal in the communication network according to the wireless internet technologies.

The vehicle may transmit and receive data with the server and various communication terminals via the 5G network. In particular, the vehicle may perform data communication with the server and the terminal via the 5G network by using at least one service among Enhanced Mobile Broadband (eMBB), Ultra-reliable and low latency communications (URLLC), and Massive Machine-type communications (mMTC).

eMBB is a mobile broadband service, and provides, for example, multimedia contents and wireless data access. Further, improved mobile services such as hotspots and broadband coverage for accommodating the rapidly growing mobile traffic may be provided via eMBB. Through a hotspot, the large-volume traffic may be accommodated in an area where user mobility is low and user density is high. Through broadband coverage, a wide-range and stable wireless environment and user mobility may be guaranteed.

The URLLC service defines the requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. A much larger number of terminals, such as sensors, than a general portable phone may be connected to a wireless access network by mMTC at the same time. In this case, the communication module price of the terminal should be inexpensive, and there is a need for improved power efficiency and power saving technology capable of operating for years without battery replacement or recharging.

The processor 400 may be provided in the server. The server may receive data about the input factor from a test vehicle, and the processor 400 may derive the amount of increase in the braking pressure required by performing the artificial intelligence model learning based on the received data.

The test vehicle may refer to a vehicle capable of generating data about the input factor, that is, the vehicle speed, the wear level of the brake pad 100, the traveling distance of the vehicle, the braking distance of the vehicle, the braking pressure of the brake pad 100, etc. The test vehicle may be a vehicle that is prepared for testing for the artificial intelligence model learning or an actually travelled vehicle.

The controller 300 may receive information about the amount of increase in the braking pressure from the server. The controller 300 may receive information about the amount of increase in the braking pressure for each condition, which has been derived by the processor 400 through the artificial intelligence model learning, from the server. Further, the controller 300 may control the brake pad 100 so that the brake pad 100 has the amount of increase in the braking pressure suitable for the traveling condition of the vehicle based on the received information.

In an embodiment, the amount of increase in the braking pressure may be a value for setting the amount of increase in the braking distance to zero. That is, a value at which the current braking distance becomes equal to the initial braking distance again may be set to the amount of increase in the braking pressure.

Figure 5:
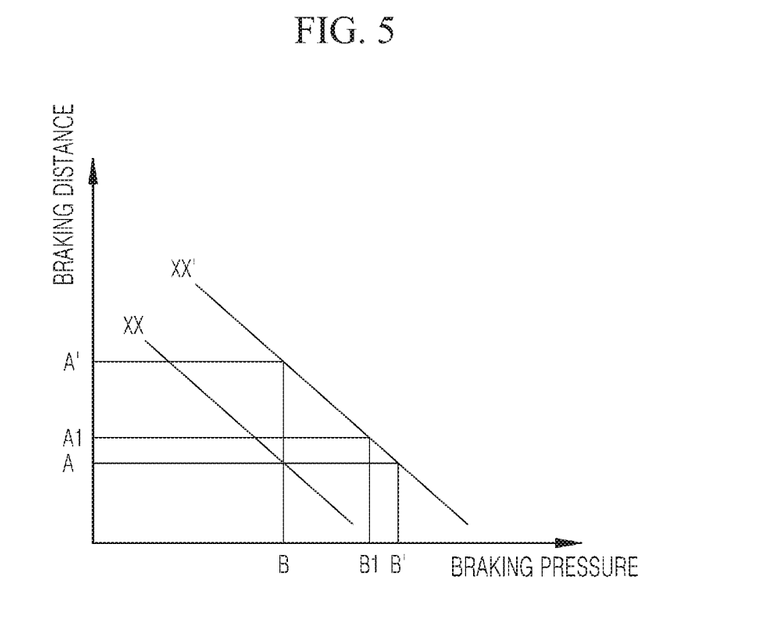
FIG. 5 is a graph for explaining the relationship between the braking pressure and the braking distance of the vehicle according to an embodiment.

FIG. 5 is a graph for explaining the relationship between the braking pressure and the braking distance of the vehicle according to an embodiment.

Referring to FIG. 5, when the braking pressure is B, the initial braking distance before traveling of the vehicle is A and the current braking distance after traveling of the vehicle during a certain duration has been increased to A'. The amount of increase in the braking pressure may be B'-B that is a value at which the amount of increase in the braking distance A'-A is set to zero.

In another embodiment, the amount of increase in the braking pressure may be a value for setting the amount of increase in the braking distance to a positive setting value. Referring to FIG. 5, when the amount of increase in the braking pressure is B'-B, the amount of increase in the braking pressure may be excessive, and the brake pad 100 should apply the braking pressure of B' to the brake disc.

Accordingly, when the amount of increase in the braking pressure is B'-B, excessive braking pressure may be applied to the brake pad 100 and the brake disc, thereby promoting wear of the brake pad 100, shortening the span life of the entire brake apparatus including the brake pad 100, and increasing the risk of occurrence of an accident during traveling of the vehicle.

For these reasons, the amount of increase in the braking pressure may be set to a value larger than the value at which the amount of increase in the braking distance is zero. The setting value of the amount of increase in the braking pressure may be set considering whether the risk of an accident may be reduced or whether it is appropriate for the safety of the traveling of the vehicle.

Referring to FIG. 5, for example, the setting value of the amount of increase in the braking pressure may be B1-B. When the braking pressure is B, the initial braking distance before traveling of the vehicle has been A and the current braking distance after traveling of the vehicle during a certain duration has been increased to A'.

At this time, since the setting value of the amount of increase in the braking pressure is B1-B, the braking pressure of the brake pad 100 becomes B1, the braking distance becomes A1, and the amount of increase in the braking distance becomes A1-A.

The setting value of the amount of increase in the braking distance may be set differently, respectively, in the condition where the vehicle speeds are different from each other. When the vehicle speed at braking is fast, it is necessary to reduce the setting value of the amount of increase in braking distance compared with a case where the speed is slow.

This is to reduce the wear of the brake pad 100, and extend the span life of the entire brake apparatus because the brake pad 100 applies a large braking pressure to the brake disc for braking when the vehicle speed is fast at braking.

Figure 6:
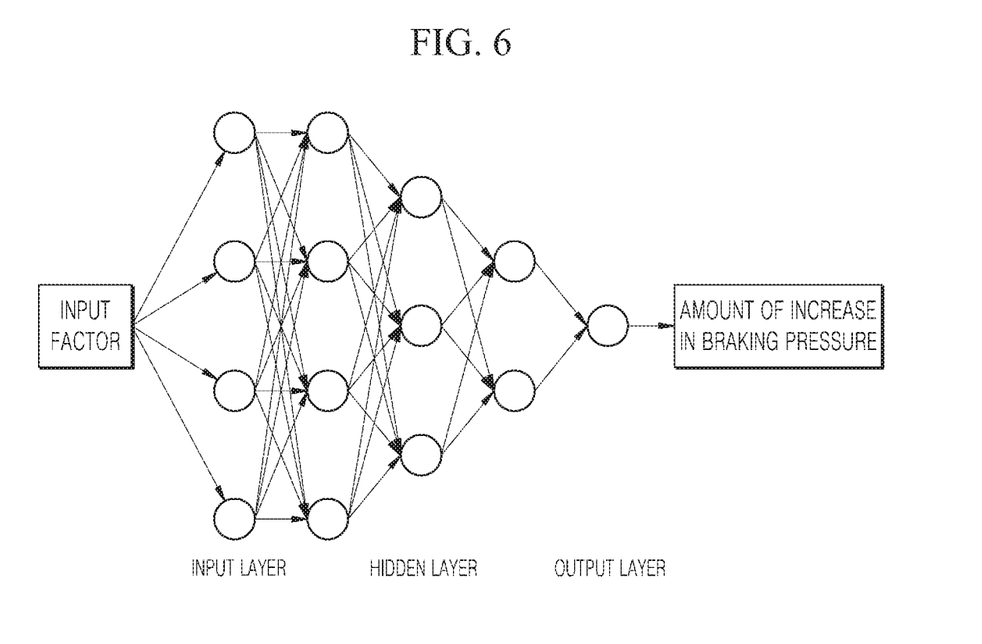
FIG. 6 is a diagram for explaining an artificial intelligence neural network according to an embodiment.

FIG. 6 is a diagram for explaining an artificial intelligence neural network according to an embodiment. The artificial intelligence neural network is provided in the processor 400, and the processor 400 may learn an artificial intelligence model through the artificial intelligence neural network.

In FIG. 6, the amount of increase in the braking pressure may be derived in a condition where at least one of the vehicle speed, the wear level of the brake pad 100, the traveling distance of the vehicle, the braking distance of the vehicle, and the braking pressure of the brake pad 100 is different in the learning mode according to the artificial intelligence model. The derived amount of increase in the braking pressure may also be changed when each condition is different.

At this time, the amount of increase in the braking pressure, as described above, may be a value to set the amount of increase in the braking distance to 0 or a positive setting value. The processor 400 may derive the amount of increase in the braking pressure in each condition by learning.

The artificial intelligence model learning may be performed in an artificial intelligence neural network composed of an input layer to which an input factor is input, an output layer for deriving a minimum output, and a plurality of hidden layers between the input layer and the output layer.

The processor 400 may receive the input factor, and based on it, perform the artificial intelligence model learning to derive the amount of increase in the braking pressure required for the brake pad 100.

As described above, the input factor may be at least one of the vehicle speed, the wear level of the brake pad 100, the traveling distance of the vehicle, the braking distance of the vehicle, and the braking pressure of the brake pad 100. Further, the factors affecting the derivation of the amount of increase in the braking pressure of the brake pad 100 may additionally be the input factor.

When the input factors having different conditions are input to the artificial neural network, the processor 400 may learn the artificial intelligence model to derive the amount of increase in the braking pressure of the brake pad 100 corresponding to the condition.

The processor 400 may perform the learning mode in order to derive the amount of increase in the braking pressure. When the input factors having different conditions in the learning mode are input to the artificial neural network of the processor 400, the processor 400 may perform the artificial intelligence model learning based on the input factors.

Referring to FIG. 5, when a value at which the amount of increase in the braking distance is set to zero is set to the amount of increase in the braking pressure, for example, the processor 400 may confirm the trend of a change in the braking distance according to a change in the braking pressure from the input factor received from the controller 300, confirm the braking pressure B' at which the braking distance becomes equal to the initial braking distance A therefrom, and derive the amount of increase in the braking pressure B'-B required from the braking pressure B', through the artificial intelligence model learning.

When the value at which the amount of increase in the braking distance is set to zero is set to the amount of increase in the braking pressure, for example, the processor 400 may confirm the trend of a change in the braking distance according to a change in the traveling distance from the input factor received from the controller 300 through the artificial intelligence model learning. Further, the processor 400 may confirm the trend of the change in the braking pressure according to the change in the traveling distance through the artificial intelligence model learning.

The processor 400 may confirm the trend of the change in the braking distance according to the change in the braking pressure from the confirmed trend of the change in the braking distance and the confirmed trend of the change in the braking pressure, confirm the braking pressure B' at which the braking distance becomes equal to the initial braking distance A therefrom, and derive the amount of increase in the braking pressure B'-B required from the braking pressure B'.

When a value at which the amount of increase in the braking distance is set to a positive setting value is set to the amount of increase in the braking pressure, for example, the processor 400 may confirm the trend of the change in the braking distance according to the change in the braking pressure from the input factor received from the controller 300, confirm the braking pressure B1 at which the braking distance becomes A1 therefrom, and derive the amount of increase in the braking pressure B1-B required from the braking pressure B1, through the artificial intelligence model learning.

When a value at which the amount of increase in the braking distance is set to a positive setting value is set to the amount of increase in the braking pressure, for example, the processor 400 may confirm the trend of the change in the braking distance according to the change in the traveling distance from the input factor received from the controller 300 through artificial intelligence model learning. Further, the processor 400 may confirm the trend of the change in the braking pressure according to the change in the traveling distance through the artificial intelligence model learning.

The processor 400 may confirm the trend of the change in the braking distance according to the change in the braking pressure from the confirmed trend of the change in the braking distance and the confirmed trend of the change in the braking pressure, confirm the braking pressure B1 at which the braking distance becomes A1 therefrom, and derive the amount of increase in the braking pressure B1-B required from the braking pressure B1.

In the foregoing manner, the processor 400 may perform the artificial intelligence model learning, and perform the learning in a similar manner even with respect to the other input factors, not described in the above, to derive the required amount of increase in the braking pressure.

The amount of increase in the braking pressure may be a different value in the condition where the input factors are different from each other. Accordingly, the amount of increase in the braking pressure may be a value learned and derived by the processor 400 in each condition where at least one of the input factors is different.

When at least one of the input factors, that is, the vehicle speed, the wear level of the brake pad 100, the traveling distance of the vehicle, the braking distance of the vehicle, and the braking pressure of the brake pad 100 is different, the amount of increase in the braking pressure may be derived by the learning in each condition. The processor 400 may derive the amount of increase in the braking pressure in each condition by the learning.

For example, when using a RNN as the artificial intelligence learning model, the input factors of different conditions are sequentially input to the artificial neural network at different times, and the combination and operation of the input factors in the hidden layer may be performed to derive the amount of increase in the braking pressure required in each condition where the input factors are different from each other.

Referring back to FIG. 4, the brake control system may further include a memory unit 500 for storing information about the amount of increase in the braking pressure. The amount of increase in the braking pressure is a value that has been learned in the condition where the input factors are different from each other through the processors 400. That is, the amount of increase in the braking pressure derived from the processor 400 may be stored in the memory unit 500.

The controller 300 may select the amount of increase in the braking pressure based on the information about the amount of increase in the braking pressure stored in the memory unit 500. The memory unit 500 stores a value of the respective amounts of increase in the braking pressures in the condition where the input factors are different from each other. Accordingly, the controller 300 may control so that the motor has the selected minimum output by selecting the amount of increase in the braking pressure corresponding to the input factors that are the same as the current traveling conditions of the vehicle by using the information stored in the memory.

In an embodiment, the processor 400 may learn the artificial intelligence model from time to time, and the information about the input factor and the amount of increase in the braking pressure changed according to the learning result may be updated in the memory unit 500.

Figure 7:
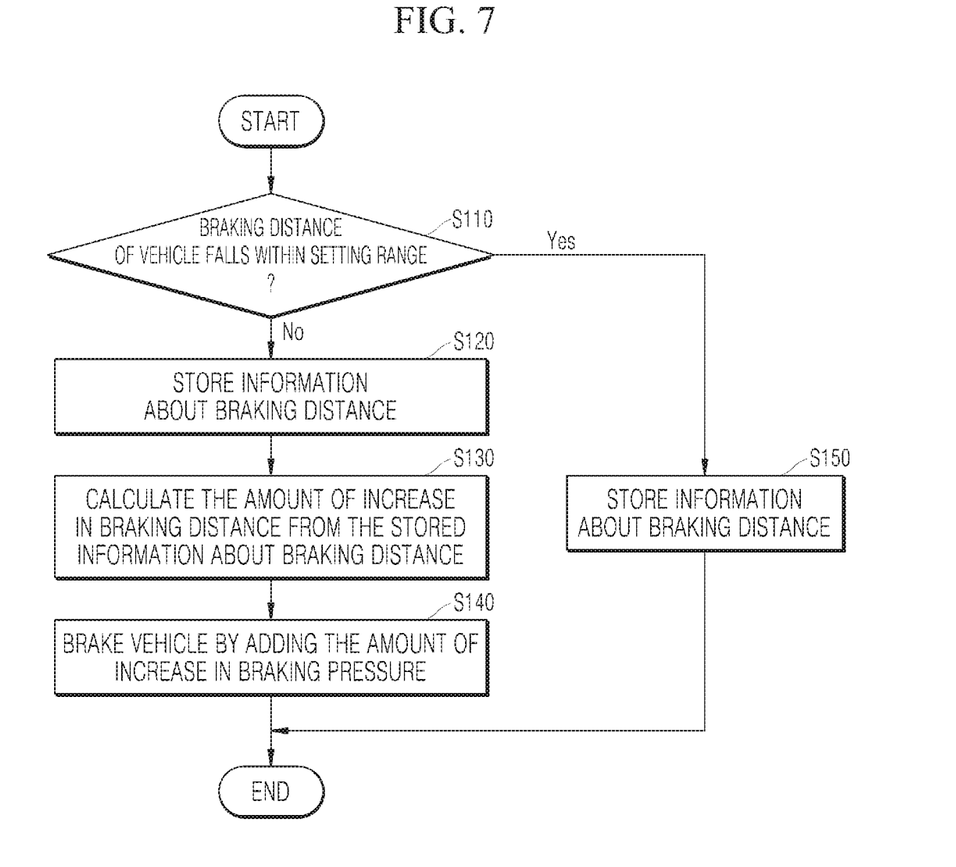
FIG. 7 is a flowchart for explaining a method for operating the brake control system used in the vehicle according to an embodiment.

FIG. 7 is a flowchart for explaining a method for operating the brake control system used in the vehicle according to an embodiment. As described above, the brake control system may include the controller 300 for controlling an operation of the brake pad 100.

The controller 300 may determine whether the braking distance of the vehicle falls within the setting range (operation S110). The controller 300 may determine whether the braking distance of the vehicle from the vehicle speed, the braking pressure, and the braking distance at braking, which is input from the measuring apparatus 200 falls within the setting range.

As described above, FIG. 3 shows the relationship between the braking pressure and the braking distance in a state where the vehicle speed is the same at braking. In FIG. 3, the line XX indicates the relationship according to the design value of the braking distance before the initial traveling of the vehicle, and the line XX' indicates the relationship after the vehicle is travelled during a certain duration. The line XX" indicates the relationship between the braking pressure and the braking distance that may reduce the risk of an accident, and may be the setting range of the braking distance.

In the operation S110, for example, when the braking distance has exceeded A" at the braking pressure B, the controller 300 may determine that the braking distance of the vehicle has exceeded the setting range.

When the braking distance of the vehicle is out of the setting range, the controller 300 may store information about the braking distance in the memory unit 500 (operation S120). Referring to FIG. 3, when the braking pressure is B, the controller 300 may store the current braking distance A'.

The controller 300 may calculate the amount of increase in the braking distance from the stored information about the braking distance (operation S130). Referring to FIG. 3, when the braking pressure is B, the amount of increase in the braking distance becomes A'-A.

The controller 300 may operate the brake pad 100 to brake the vehicle. At this time, the controller 300 may add the amount of increase in the braking pressure corresponding to the amount of increase in the braking distance to the braking pressure to brake the vehicle (operation S140).

The amount of increase in the braking pressure may be a value at each vehicle speed condition, which has been learned according to the artificial intelligence model so that the amount of increase in the braking distance satisfies the setting range in the condition where the vehicle speeds are different from each other.

The controller 300 may be connected with the processor 400 for deriving the amount of increase in the braking pressure of the brake pad 100, and the processor 400 may be provided in the server that communicates with the brake control system by the communication unit. The processor 400 may perform the learning according to the artificial intelligence model, and receive at least one input factor to derive the amount of increase in the braking pressure.

The input factor may be factors affecting the derivation of the amount of increase in the braking pressure of the brake pad 100 such as the vehicle speed, the wear level of the brake pad 100, the traveling distance of the vehicle, the braking distance of the vehicle, the braking pressure of the brake pad 100, etc.

The amount of increase in the braking pressure may be a value at which the amount of increase in the braking distance is set to zero or a positive setting value in the condition where at least one of the vehicle speed, the wear level of the brake pad 100, the traveling distance of the vehicle, the braking distance of the vehicle, and the braking pressure of the brake pad 100 in the learning mode according to the artificial intelligence model is different.

The amount of increase in the braking pressure may be derived by the artificial intelligence model learning in the processor 400 provided in the server after receiving the input factor, and the derived amount of increase in the braking pressure may be transmitted from the server to the controller 300 to be stored in the memory unit 500.

The controller 300 may select a value corresponding to the current traveling condition among the values about the amount of increase in the braking pressure for each traveling condition stored in the memory unit 500 to increase the braking pressure.

Referring to FIG. 5, when the braking pressure is B, the initial braking distance is A, and the current braking distance is A'. In order to make the amount of increase in the braking distance equal to zero, that is, for the current braking distance of the vehicle to be equal to the initial braking distance, the controller 300 changes the braking pressure from B to B', which is a value obtained by adding the amount of increase in the braking pressure B'-B derived from the artificial intelligence model learning, to brake the vehicle.

Referring to FIG. 5, when the amount of increase in the braking distance is set to a positive setting value A1-A, the controller 300 changes the braking pressure from B to B1, which is a value obtained by adding the amount of increase in the braking pressure B1-B derived from the artificial intelligence model learning, to brake the vehicle.

Referring back to FIG. 7, in the method for operating the brake control system, when the braking distance of the vehicle falls within the setting range, the controller 300 may store information about the braking distance in the memory unit 500 (operation S150).

The information about the braking distance stored in the operation S150 is data in which the braking distance falls within the setting range. At this time, the braking distance may increase gradually as the traveling duration of the vehicle increases.

At this time, the controller 300 may determine the time point when the braking distance of the vehicle reaches the setting range from the stored information about the braking distance.

Referring to FIG. 3, when the braking pressure is B, the initial braking distance is A, and when the traveling duration of the vehicle increases, the braking distance may gradually increase to reach A" that is the maximum value of the setting range. The controller 300 may determine the time point when the braking distance reaches A" from the information about the braking distance sequentially stored as the time has elapsed.

The controller 300 may measure and store data at the time point when the braking distance reaches the setting range, for example, the wear level of the brake pad 100 at this time point, the traveling distance of the vehicle, etc. The stored data may be used as an input factor in the artificial intelligence model learning for deriving the amount of increase in the braking pressure.

In an embodiment, when the braking distance increases due to the increase in the traveling duration of the vehicle, it is possible to increase the braking pressure of the brake pad 100 to reduce the braking distance, thereby suppressing occurrence of an accident due to the increase in the braking distance.

In an embodiment, an appropriate braking pressure may be selected even when vehicle traveling conditions are different from each other through the artificial intelligence model learning, thereby achieving the safety of the traveling of the vehicle.

In an embodiment, it is possible to continuously perform the artificial intelligence model learning, thereby quickly deriving the braking pressure suitable for the changed traveling condition even when the vehicle traveling condition is continuously changed.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

Although only a few have been described as described above in connection with an embodiment, other various forms of embodiments are possible. The technical contents of the foregoing embodiments may be combined in various forms, unless the technology is incompatible with each other, and accordingly, may also be implemented in a new embodiment.

What is claimed is:

1. A brake control system for use in a vehicle, comprising:
a brake pad for braking the vehicle by pressing a brake disc provided in the vehicle;
one or more sensors for measuring the vehicle speed, the wear level of the brake pad, the traveling distance of the vehicle, the braking distance of the vehicle, and the braking pressure applied by the brake pad to the brake disc at braking; and
a controller connected with the one or more sensors and for controlling an operation of the brake pad,
wherein the controller
compares an initial braking distance, which is a design value of the braking distance before initial traveling of the vehicle, with a current braking distance, which is a braking distance after traveling of the vehicle during a certain duration, and
increases the braking pressure of the brake pad in response to an amount of increase in the braking distance, when the amount of increase in the braking distance, which is a difference value between the current braking distance and the initial braking distance, is out of a setting range, and
wherein the amount of increase in the braking pressure is a value in each vehicle speed condition, which has been learned according to an Artificial Intelligence model so that the amount of increase in the braking distance satisfies the setting range in the condition where the vehicle speeds are different from each other.

2. The brake control system of claim 1,
wherein the controller is connected with a processor for deriving the amount of increase in the braking pressure of the brake pad, and
wherein the processor performs learning according to the Artificial Intelligence model, and
receives at least one input factor to derive the amount of increase in the braking pressure.

3. The brake control system of claim 2,
wherein the input factor is at least one of the vehicle speed, the wear level of the brake pad, the traveling distance of the vehicle, the braking distance of the vehicle, and the braking pressure of the brake pad.

4. The brake control system of claim 3,
wherein the amount of increase in the braking pressure is a value at which the amount of increase in the braking distance is set to zero or a positive setting value in the condition where at least one of the vehicle speed, the wear level of the brake pad, the traveling distance of the vehicle, the braking distance of the vehicle, and the braking pressure of the brake pad is different, in the learning mode according to the Artificial Intelligence model.

5. The brake control system of claim 2,
wherein the brake control system further comprises a transceiver for communicating with a server, and
wherein the processor is provided in the server.

6. The brake control system of claim 5,
wherein the controller receives information about the amount of increase in the braking pressure from the server.

7. The brake control system of claim 2,
wherein the brake control system further comprises a memory unit for storing information about the amount of increase in the braking pressure, and
wherein the controller selects the amount of increase in the braking pressure based on the information about the amount of increase in the braking pressure stored in the memory unit.

8. The brake control system of claim 1,
wherein the amount of increase in the braking pressure is a value at which the amount of increase in the braking distance is set to zero.

9. The brake control system of claim 1,
wherein the amount of increase in the braking pressure is a value at which the amount of increase in the braking distance is set to a positive setting value.

10. The brake control system of claim 9,
wherein the setting value of the amount of increase in the braking distance is set differently, respectively, in the condition where the vehicle speeds are different from each other.

11. A method for operating a brake control system for use in a vehicle, comprising:
determining whether the braking distance of the vehicle falls within a setting range;
storing information about the braking distance, when the braking distance of the vehicle is out of the setting range;
calculating an amount of increase in the braking distance from the stored information about the braking distance; and
braking the vehicle by adding the amount of increase in the braking pressure corresponding to the amount of increase in the braking distance to the braking pressure,
wherein the amount of increase in the braking pressure is a value in each vehicle speed condition, which has been learned according to an Artificial Intelligence model so that the amount of increase in the braking distance satisfies the setting range in the condition where the vehicle speeds are different from each other.

12. The method for operating the brake control system of claim 11,
wherein the brake control system comprises a controller for controlling an operation of the brake pad,
wherein the controller is connected with a processor for deriving the amount of increase in the braking pressure of the brake pad, and
wherein the processor
performs learning according to the Artificial Intelligence model, and
receives at least one input factor to derive the amount of increase in the braking pressure.

13. The method for operating the brake control system of claim 12,
wherein the input factor is at least one of the vehicle speed, the wear level of the brake pad, the traveling distance of the vehicle, the braking distance of the vehicle, and the braking pressure of the brake pad.

14. The method for operating the brake control system of claim 13,
wherein the amount of increase in the braking pressure is a value at which the amount of increase in the braking distance is set to zero or a positive setting value in the condition where at least one of the vehicle speed, the wear level of the brake pad, the traveling distance of the vehicle, the braking distance of the vehicle, and the braking pressure of the brake pad is different, in the learning mode according to the Artificial Intelligence model.

15. The method for operating the brake control system of claim 12, further comprising storing information about the braking distance, when the braking distance of the vehicle falls within the setting range.

16. The method for operating the brake control system of claim 15,
wherein the controller determines the time point when the braking distance of the vehicle reaches the setting range from the stored information about the braking distance.

17. A computer program stored in a non-transitory computer readable recording medium for operating a brake control system for use in a vehicle, the computer program comprising instructions for:
determining whether the braking distance of the vehicle falls within a setting range;
storing information about the braking distance, when the braking distance of the vehicle is out of the setting range;
calculating an amount of increase in the braking distance from the stored information about the braking distance; and
braking the vehicle by adding the amount of increase in the braking pressure corresponding to the amount of increase in the braking distance to the braking pressure,
wherein the amount of increase in the braking pressure is a value in each vehicle speed condition, which has been learned according to an Artificial Intelligence model so that the amount of increase in the braking distance satisfies the setting range in the condition where the vehicle speeds are different from each other.

* * * * *